United States Patent [19]

Knepler

[11] Patent Number: 5,019,690
[45] Date of Patent: May 28, 1991

[54] BOILING WATER DISPENSER HAVING IMPROVED WATER TEMPERATURE CONTROL SYSTEM

[75] Inventor: John T. Knepler, Chatham, Ill.

[73] Assignee: Bunn-O-Matic Corporation, Springfield, Ill.

[21] Appl. No.: 407,811

[22] Filed: Sep. 15, 1989

[51] Int. Cl.⁵ ............................................. F24H 1/10
[52] U.S. Cl. ................................... 219/400; 99/281; 219/437; 392/449
[58] Field of Search .................. 99/280, 281, 282; 219/297, 306, 308, 310, 312, 316, 323, 337, 328, 314, 437, 441, 442; 219/333, 330, 331

[56] References Cited

U.S. PATENT DOCUMENTS

| | | | |
|---|---|---|---|
| 3,784,788 | 1/1974 | Fourny | 99/281 |
| 4,455,477 | 6/1984 | Massey et al. | 99/281 |
| 4,544,830 | 10/1985 | Miller | 219/437 |
| 4,602,145 | 7/1986 | Roberts | 219/297 |

Primary Examiner—Bruce A. Reynolds
Assistant Examiner—Tu Hoang
Attorney, Agent, or Firm—Richard Bushnell

[57] ABSTRACT

A boiling water dispenser includes a hot water reservoir, a user-actuated faucet for drawing boiling water from a discharge zone at the top of the reservoir, and a solenoid-actuated valve for admitting unheated water to an inlet zone at the bottom of the reservoir. An electric resistance heating element within the reservoir is supplied with AC current through a series-connected bilateral switch device which is periodically switched on and off in response to the sensing of steam in a reservoir venting conduit to maintain the dispensing temperature at the boiling point. An indicator lamp conditioned by a sensor in the reservoir confirms to the user that the dispensing temperature is at the boiling point.

14 Claims, 6 Drawing Sheets

BOILING WATER DISPENSER HAVING IMPROVED WATER TEMPERATURE CONTROL SYSTEM

BACKGROUND OF THE INVENTION

The present invention is directed generally to a hot water dispensing apparatus, and more particularly to a boiling water dispenser capable of dispensing large volumes of water at boiling temperature.

It is frequently desirable in restaurants and other commercial cooking establishments to have a source of hot water for various cooking purposes, such as the preparation of pastas, potatoes, gravies, soups and similar dishes, as well as for various cleaning purposes To supply hot water for these and other purposes hot water dispensers have come into increasing use. Typically, these units employ a hot water reservoir in which water is heated by an electric resistance heater element The application of electric current to the heating element is typically controlled by various means responsive to a temperature sensing element in the reservoir, such as a thermistor, to achieve a predetermined dispensing temperature. One successful commercial version of such a hot water dispenser is the Model HW-5 Hot Water Machine manufactured by Bunn-O-Matic Corporation of Springfield, Ill., U.S.A.

In many applications it is desirable that the hot water be dispensed at boiling temperature This requires that the temperature in the reservoir be maintained at the actual boiling point of the water in the reservoir. If the temperature is maintained too high, the water will continuously boil in the reservoir, resulting in a noisy, energy inefficient and steamy dispenser. If the temperature is maintained too low, the dispensed water will not be at boiling temperature and therefore unsuitable for its intended purpose. Since the actual boiling point of water in the reservoir will vary from batch to batch with changes in mineral content, elevation and barometric pressure, the use of a temperature sensing element in the reservoir does not provide satisfactory temperature control over an extended period of use.

The present invention provides a boiling water dispenser wherein temperature control is effected by sensing the initial occurrence of boiling of the water in the reservoir, and maintaining a level of excitation to the reservoir heating element which maintains this condition. This results in water always being dispensed from the reservoir at its actual boiling point Accordingly, it is a general object of the present invention to provide a new and improved hot water dispenser.

It is a more specific object of the present invention to provide a boiling water dispenser which efficiently dispenses large volumes of water at its actual boiling temperature.

SUMMARY OF THE INVENTION

The invention is directed to a boiling water dispensing apparatus comprising a hot water reservoir of predetermined volume means including a resistance heating element within the reservoir operable from an applied electric current for heating water in the reservoir, inlet means for admitting cold water into the reservoir, and outlet means for discharging heated water from the reservoir. Temperature regulating means responsive to the occurrence of boiling of the water in the reservoir control the application of electrical current to the resistance heating element to maintain the water in the reservoir at its actual boiling point.

BRIEF DESCRIPTION OF THE DRAWINGS

The features of the present invention which are believed to be novel are set forth with particularity in the appended claims The invention, together with the further objects and advantages thereof, may best be understood by reference to the following description taken in conjunction with the accompanying drawings, in the several figures of which like reference numerals identify like elements, and in which:

DESCRIPTION OF THE PREFERRED EMBODIMENT

Figures 1, 5, 6, 7:
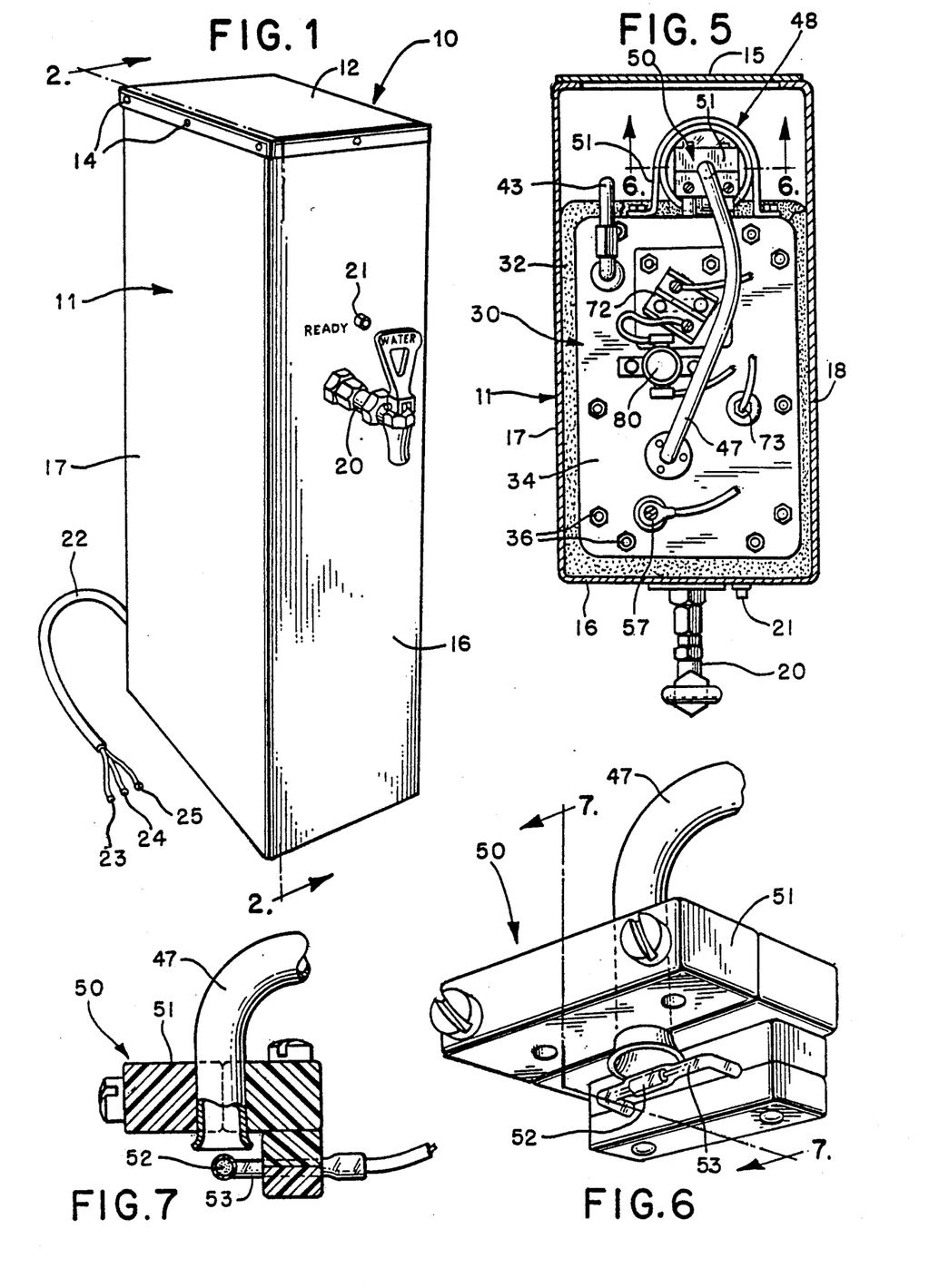
FIG. 1 is a perspective view of a boiling water dispenser constructed in accordance with the invention.
FIG. 5 is a top cross-sectional view of the boiling water dispenser taken along line 5—5 of FIG. 2.
FIG. 6 is an enlarged cross-sectional view of the steam detector of the boiling water dispenser taken along 6—6 of FIG. 5.
FIG. 7 is cross-sectional view of the steam detector taken along 7—7 of FIG. 6.
Figure 2:
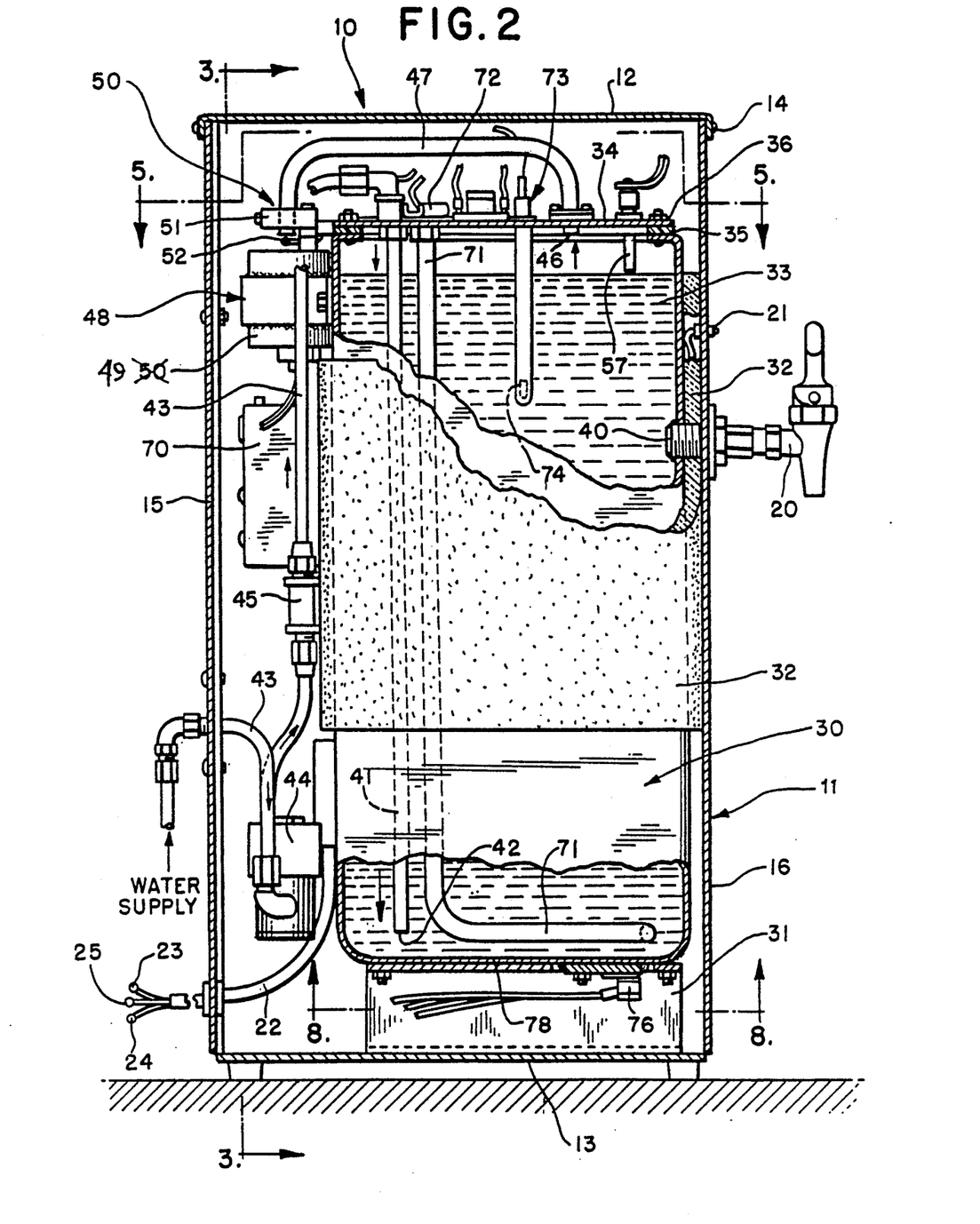
FIG. 2 an enlarged side cross-sectional view taken along line 2—2 of FIG. 1 partially in section to show the principal components of the boiling water dispenser.
Figure 3:
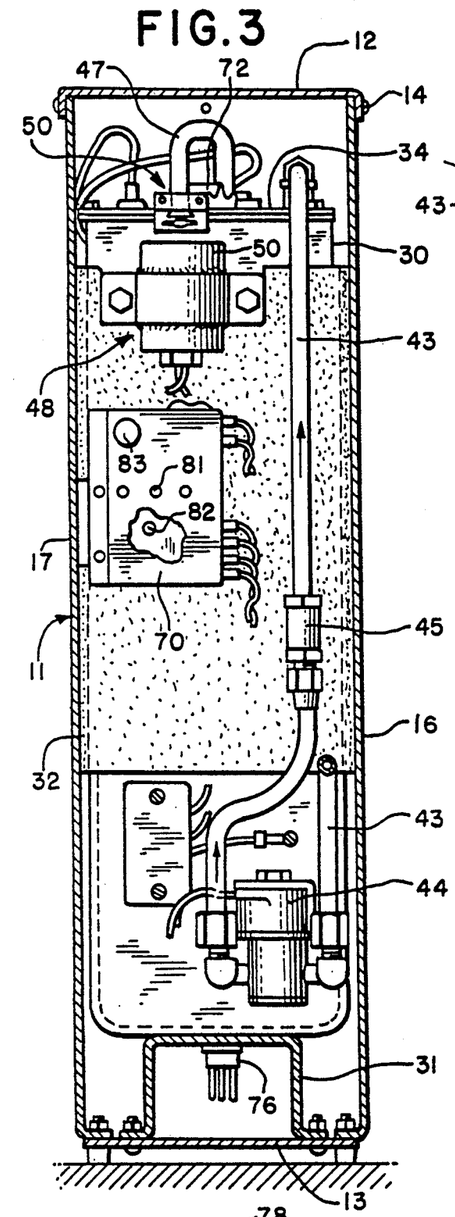
FIG. 3 is a rear cross-sectional view of the boiling water dispenser taken along line 3—3 of FIG. 2.

Referring to the Figures, and particularly to FIGS. 1-3, a boiling water dispenser 10 constructed in accordance with the invention is seen to include an outer housing 11 formed of stainless steel or other appropriate material. A removable cover 12 is provided at the top of the housing to provide access to the interior thereof for adjustment and servicing. A removable cover 13 (FIGS. 2 and 3) is provided at the bottom of housing 11 for the same purpose. A plurality of machine screws 14 may be provided to secure the removable top cover 12 in position. A rear panel 15 (FIG. 2) may be provided to enclose the rear of the housing. Overall, the housing 11 is preferably upstanding in form and includes vertically-elongated front, left side and right side panels 16, 17 and 18, respectively.

The front panel 16 of housing 11 is preferably provided with user-actuated outlet means in the form of a conventional faucet assembly 20 through which water may be drawn by a user A ready light 21 is preferably provided in close proximity to faucet 20 to indicate to the user that the water being drawn through the faucet is within an acceptable range of operating temperatures. Operating power is supplied to the boiling water dispenser by a conventional electrical cable 22 extending from the rear panel of the dispenser and terminating with three connectors 23, 24 and 25, providing line $L_1$, line $L_2$ and ground connections, respectively.

Referring to FIG. 2, within housing 11 boiling water dispenser 10 is seen to include a hot water reservoir 30 which comprises an elongated generally rectangular tank mounted in an upstanding position within the housing on a support bracket 31. A layer of insulating material 32 is provided around a substantial central portion of the hot water reservoir to provide a degree of thermal isolation for a volume of water 33 contained within the reservoir. The boiling water reservoir 30 is preferably formed of stainless steel and includes a removable top plate 34 secured over its open top end by a gasket 35 and plurality of machine screws 36. Gasket 35 forms a liquid-tight seal between top plate 34 and the side walls of reservoir 30. Faucet 20 extends through the front panel 16 of housing 11 and through the side wall of reservoir 30 so as to provide a hot water discharge port 40 at a location intermediate the top and bottom ends of housing 30. It is at this location that boiling water is withdrawn from reservoir 30.

To provide for the introduction of unheated water into reservoir 30 the reservoir is provided with an internal conduit 41 which extends from cover plate 34 downwardly to the bottom portion of the reservoir, wherein the conduit terminates to provide an inlet port 42 adjacent an inlet zone at the bottom of the reservoir Unheated water from an external water supply is provided to conduit 41 through an inline conduit 43, which includes a solenoid-actuated flow control valve 44 and an inline flow regulator 45.

In the event that reservoir 30 should be over-filled for any reason a venting port 46 at the top end of the reservoir allows water to escape from the reservoir through a venting conduit 47 to an overflow safety switch assembly 48. Switch assembly 48 includes a cylindrical reservoir or receptacle 49 mounted to the rear wall of reservoir 30. Water overflowing from reservoir 30 through venting conduit 47 is discharged into the reservoir. As overflow water is collected in the reservoir a float-actuated switch opens to terminate the flow of water into reservoir 30.

In accordance with the invention, to detect the initial occurrence of water boiling in reservoir 30 a steam detector assembly 50 is provided at the end of conduit 47, above the collection reservoir or receptacle 49 of overflow switch assembly 48. In this embodiment, the overflow tube or conduit also serves as a means for isolating steam from the interior of the reservoir. As shown in FIGS. 6 and 7, this assembly comprises a positioning member 51 formed of high temperature plastic or other material of relatively low thermal conductivity which is mounted on the tube or conduit 47 so as to position a temperature sensing element 52 in the flow path of steam discharged from the reservoir through conduit 47. While various sensors capable of detecting the presence and absence of steam may be used, in the embodiment disclosed herein the sensor is a temperature responsive thermistor. In locating the thermistor at the discharge opening of the tube 47, it is immediately subjected to any temperature rise associated with the steam, while remaining relatively unaffected by the temperature of the reservoir. A sleeve 53 may be provided over the thermistor to protect the thermistor from contamination over time.

The receptacle 49 is positioned directly below the steam discharge opening and is adapted to collect condensate produced by steam flowing from the vent tube 47. Thus the interior of the dispense housing, the circuitry therein and other parts are protected against the accumulation of condensate It is to be noted that the receptacle 49 is made from metal or other heat conducting material and is heated for promoting evaporation but not boiling of any condensation collected therein. Since, in normal operation, steam will flow from the vent tube intermittently, but regularly, evaporation of the condensate is necessary to prevent operation of the float switch therein and/or overflowing of the receptacle In the embodiment shown, the receptacle is mounted in thermal contact with the reservoir 30 so as to be heated thereby.

During normal operation the level of water 33 in reservoir 30 is maintained at a predetermined maximum level by a sensing probe assembly 57 which extends downwardly through top plate 34 to the surface of the water. The probe assembly 57 is connected to water level control circuitry within a control module 70 mounted on the rear wall of reservoir 30.

Figure 4:
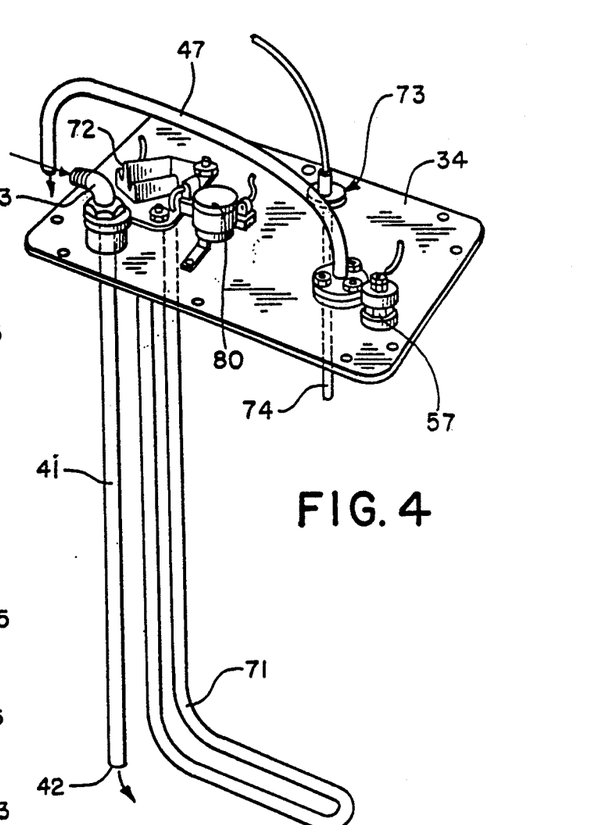
FIG. 4 is a perspective view of a reservoir cover subassembly utilized in the boiling water dispenser.

The water 33 in reservoir 30 is heated to a predetermined dispensing temperature by means of a conventional metallic-sheath type electric resistance heating element 71. As shown in FIGS. 2 and 4, this heating element 71 extends from top plate 34 downwardly within the reservoir, at the bottom end thereof being angled in a generally L-shaped configuration to provide additional heating for water entering the reservoir through inlet port 42. The heating assembly 71 is mounted by conventional means to top plate 34 and includes a conventional electrical connector assembly 72 which provides for electrical connections to an electrical current source. Temperature control is achieved by selectively applying current pulses to the heating element The temperature of the water in the reservoir is sensed by a temperature sensing probe assembly 73 which extends from top plate 34 to a position adjacent discharge port 40. In the manner described in U.S. Pat. No. 4,531,046, a thermistor 74 or other appropriate temperature sensing component is provided within a heat-conductive tubing of stainless steel, copper or other material, at the sensing location and connected to control module 70 by electrical conductors extending upwardly through the tubing and top plate 34.

The switching of electrical power to heating element 71 is accomplished by a bilateral switching device in the form of a triac 76 in response to control signals generated by the temperature control circuitry within control module 70. As a result of being periodically switched on and off substantial heat dissipation occurs in triac 76 which, if not dissipated, would ultimately result in the destruction of that device. To provide for dissipation of this heat triac 76 is mounted in thermal communication with reservoir 30, preferably to the bottom wall thereof. Thus mounted, the heat generated within the triac during the switching operation is transferred to the relatively high heat capacity of the reservoir. This obviates the need on the exterior surface of housing 11 for a separate heat sink, which could present air circulation and cleaning problems for the user.

Figure 8:
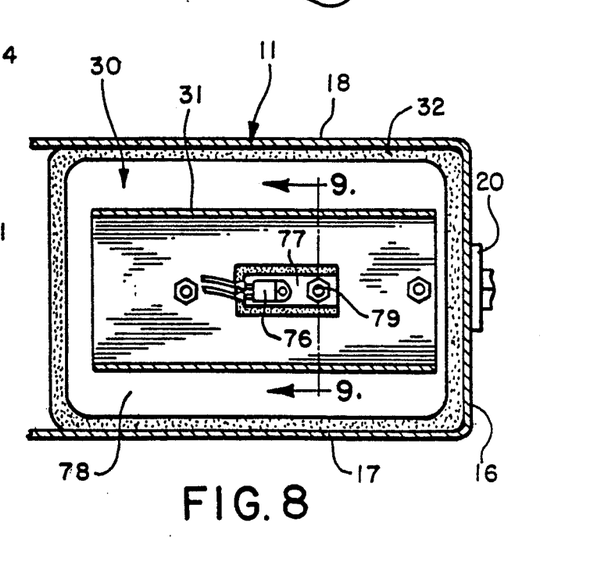
FIG. 8 is a bottom cross-sectional view of the boiling water dispenser taken along line 8—8 of FIG. 2.
Figure 9:
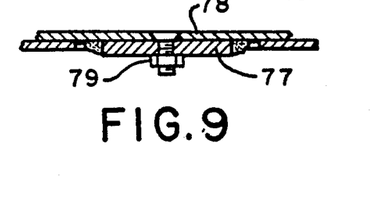
FIG. 9 is a cross-sectional view of the bottom wall of the reservoir utilized in the boiling water dispenser taken along line 9—9 of FIG. 8.

As shown in FIGS. 8 and 9, to avoid hot spots triac 76 may in accordance with conventional practice be mounted on a metallic block of copper 77 or other material having a high thermal conductivity. This block may, in turn, be mounted to the bottom wall 78 of the reservoir by a machine screw 79 or other appropriate mounting means. A heat conductive paste may be provided to assist in the thermal coupling of the triac to the reservoir.

As shown in FIG. 4, the top plate 34 together with the attached inlet conduit 41, resistance heating element 71, temperature probe 54 and level sensing probe 57 may be assembled as a subassembly for installation as a unit in the water reservoir. An over-temperature switch 80 may be mounted on top plate 34 and connected in series-circuit relationship with resistance heating element 71 to interrupt the application of power to the heating element in the event that an over-temperature condition is sensed at top plate 34.

In normal operation, as hot water is withdrawn from the reservoir through faucet 20 the water level in the reservoir drops As a result, probe 57 no longer contacts the water and control module 70 causes solenoid actuated valve 44 to open. Water then flows into the reservoir through conduit 43 at a rate established by flow rate regulator 45. This flow rate is lower than the flow rate through the faucet. Consequently, the water drawn through faucet 20 is primarily from that portion of the reservoir above the faucet, which water is at the desired dispensing temperature. As the water level drops the flow rate through the faucet drops, until it equates the flow rate of the incoming water. Thus, boiling water dispenser 10 provides the greatest possible volume of heated water at faucet 20 for the volume of the reservoir and the heating capacity of resistance heating element 71. In other words, the arrangement is such that substantially all of the hot water in the head above the faucet will be dispersed before any of the incoming water.

To preclude the inadvertent use of insufficiently heated water, a temperature probe assembly 73 provides a signal to control module 70 indicative of the water temperature in the dispensing zone of faucet 40. Within module 70 this signal is monitored and in the event that the temperature at faucet 20 falls outside of a predetermined operating range indicator lamp 21 is extinguished. Thus, should the user exceed the capacity of boiling water dispenser 10 indicator lamp 21 will be extinguished to alert the user to wait until the resistance heating element 71 has brought the water in the reservoir back to its operating temperature. In this way, the dispenser provides protection against the consequences of insufficiently heated water.

As shown in FIG. 3, control module 70 includes a first potentiometer 81 for setting the temperature at which the ready light 21 is illuminated. An LED indicator lamp 82 within module 70 viewable by the user lights to indicate those time periods in which the resistance heating element 71 is energized A second potentiometer 83 provides for adjustment of the range or operating window of temperatures at which the ready light is lit to indicate acceptable dispensing temperatures.

Figure 10:
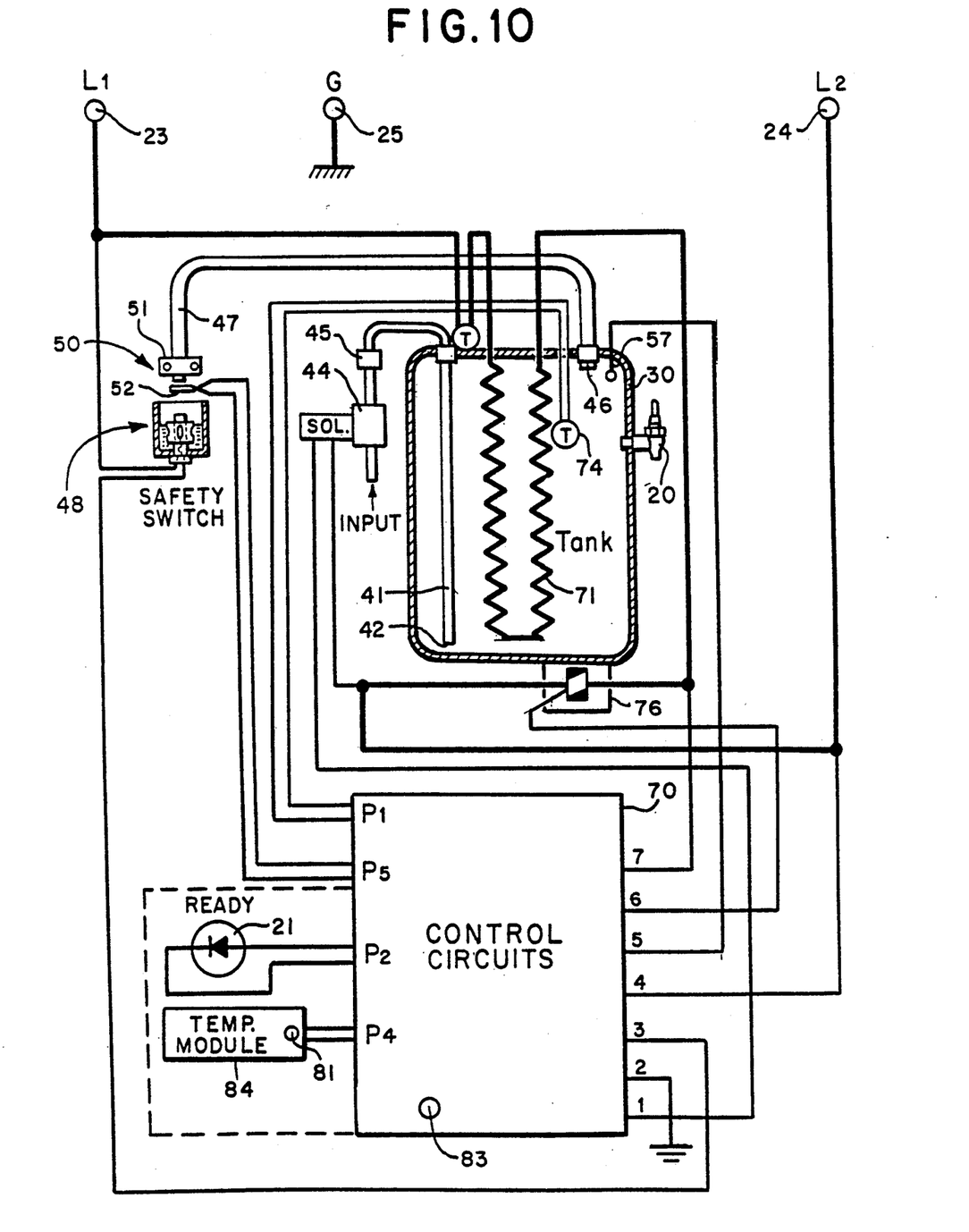
FIG. 10 is a simplified functional block diagram partially in schematic form showing the principal components of boiling water dispenser.

Referring to FIG. 10, control circuits 70 are seen to include a temperature control module 84 which can be interchanged on connector P4 to permit operation in different temperature ranges.

In accordance with the invention, thermistor 52 provides an indication of steam occurrence, and hence boiling temperature in the reservoir 30, which is utilized to control the excitation of heating element 71. One way in which this may be done is illustrated, for example, in FIG. 11, where thermistor 52 is seen to be connected in a conventional manner to one input of a conventional comparator 90. The other input of comparator 90 is connected to a source of reference voltage, so that upon the resistance of thermistor 52 changing, as from the presence of steam in conduit 47, the comparator produces an output signal This output signal causes a conventional ripple-carry binary counter 91 to be reset, and counter output Q1 and an OR gate 92 to condition a latch 93 to interrupt excitation to resistance heater 71.

Figure 11:
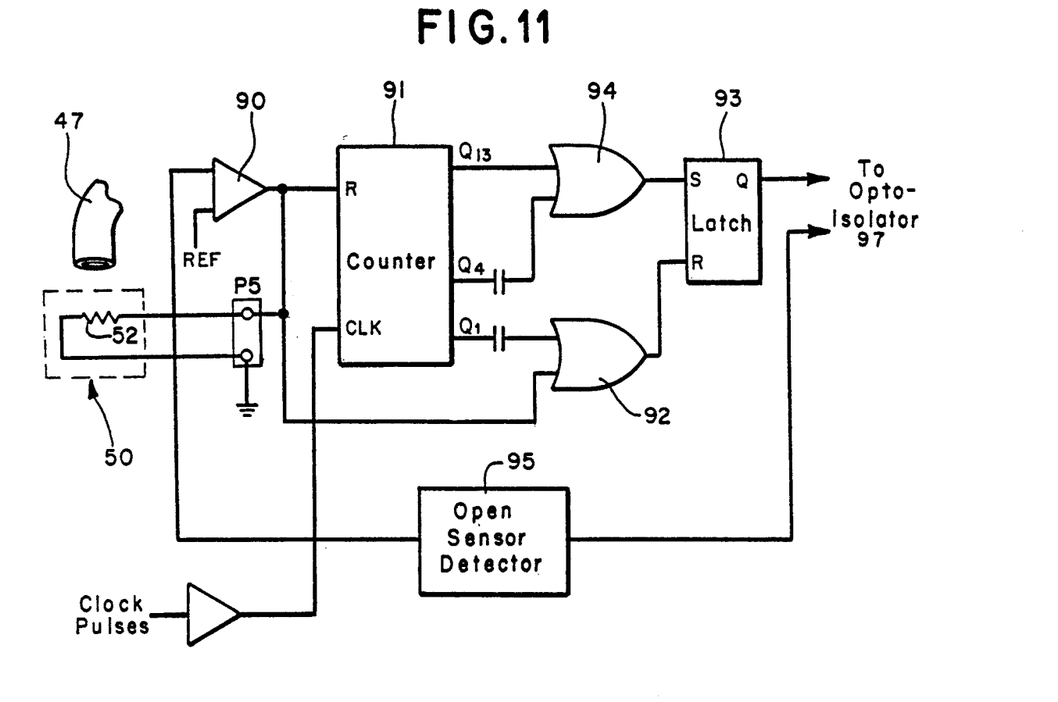
FIG. 11 is a simplified functional block diagram partially in schematic form showing the principal components of the reservoir temperature control system of the boiling water dispenser of the invention.

When comparator 90 detects a cool sensor, i.e. no steam, the reset signal is removed from counter 91. The counter then begins counting applied 60 hertz clock pulses until output Q4 sets latch 93, which switches an opto-isolator 97 and triac 76 to a conductive state to power the heater After one full AC line cycle the Q1 output resets latch 93, and the triac is conditioned open and excitation is terminated. This cycle repeats every 16 AC cycles, resulting in application of 1/16 duty cycle partial power to resistance heater 71.

Should steam continue to not be generated, the DC-coupled Q13 output of counter 91 eventually causes latch 93 to be permanently set and heater 71 to be continuously powered This continues until steam is detected, and comparator 90 applies a reset signal to counter 90 and power is removed from heater 71. An open sensor circuit 95 removes power from heater 71 in the event that temperature sensor 52 becomes open or disconnected.

The selection of 1/16 duty cycle from reduced power and the time delays for full power and the ready lamp are set by selection of the Q outputs of the counter These parameters may be different for different dispenser parameters For example, a dispenser with an 1800 watt heater would require a higher duty cycle than the 1/16 value used for reduced power on a dispenser with a 4000 watt heater. The parameters can be easily changed by selecting different Q outputs of the counter The counter may be a conventional commercially available CMOS ripple-carry counter, such as the type CD4020B.

Figure 13:
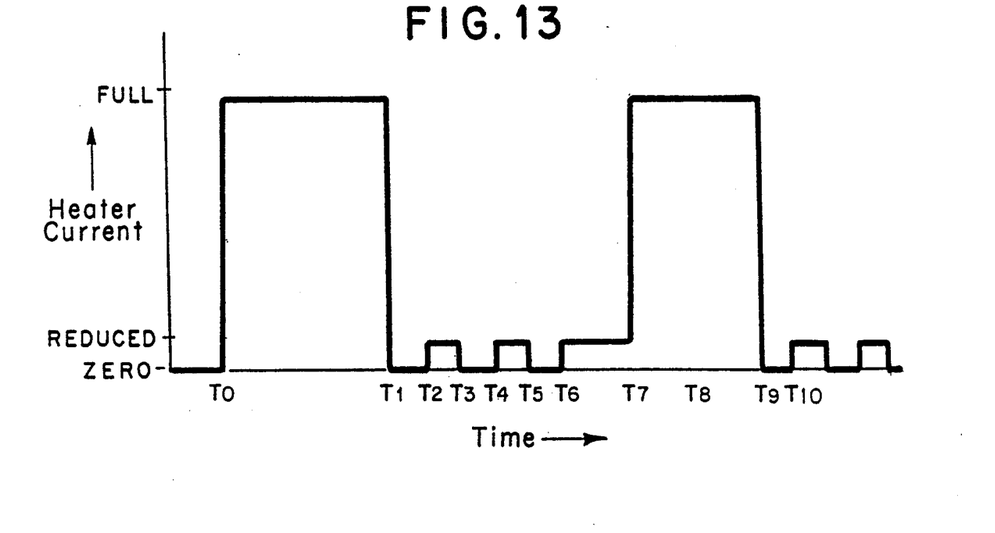
FIG. 13 is a graphic depiction of certain time and current relationships useful in understanding the operation of the boiling water dispenser of the invention.

This mode of operation is illustrated graphically in FIG. 13, which shows a plot of tank heater power versus time for a hypothetical set of conditions and a machine initially filled with cool water At time T0 the dispenser is turned on and the control circuit applies full power to the tank heater. In practice, a typical value for full power may be 4000 watts. At time T1 steam flows across sensor 52 and the control circuit removes all power from the tank heater After a short time (in practice, typically 30 seconds) the sensor cools to a point where the control applies reduced power at time T2. Reduced power may be typically 250 watts, and is achieved by lowering the duty cycle of the current applied to the heater, i.e. the current is applied for one of every 16 AC power line cycles. Since the water in the reservoir is very near boiling, a short time passes until steam is again produced at T3 and the heater is turned off. This cycle repeats itself as the dispenser remains idle through T4, T5 and T6. Shortly after T6 water is drawn from the faucet (and automatically replaced by the refill circuit) and the reduced power level is not sufficient to raise the temperature to boiling. At T7 the Control applies full power to the heater until steam is again produced at T9. The dispenser then returns to the idle condition beginning at T10.

Temperature sensor 52 is mounted with material that is a poor conductor of heat. This is done so that the sensor temperature will not be raised by conduction from the venting conduit or from the reservoir. It is desirable to have the highest possible differential between the sensor temperature when there is no steam present as opposed to when steam is emitted from the conduit. This allows the use of a relatively inexpensive sensor and a heater control system which requires no factory calibration.

The heater control system described is unaffected by changes in boiling point as might be caused by water purity or altitude The only requirement is that there be a few degrees difference between the ambient air around the sensor and the water boiling point.

Figure 12:
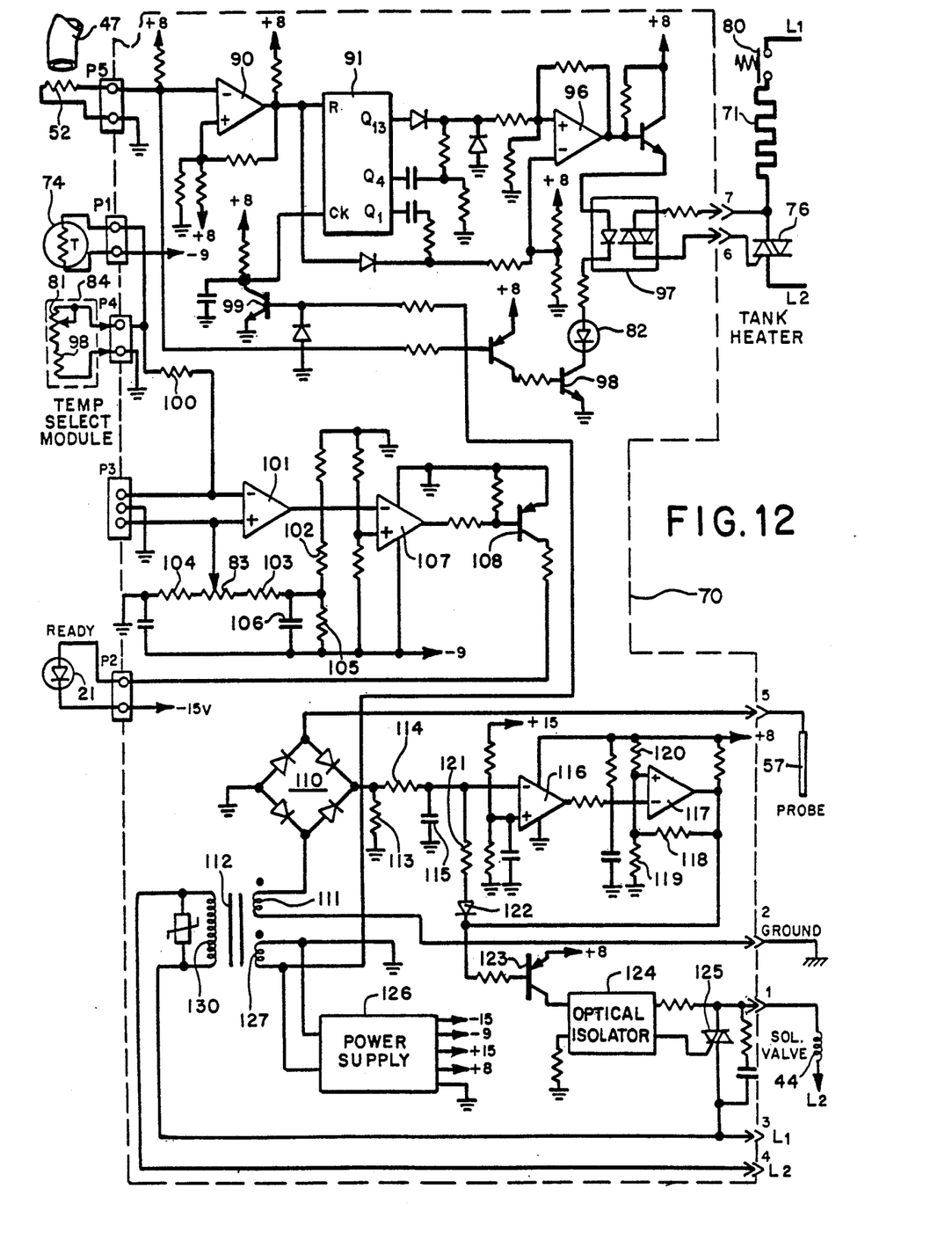
FIG. 12 is a simplified schematic diagram of the control circuitry utilized in the boiling water dispenser of the invention.

Referring to FIG. 12, as incorporated in control module 70 the reservoir heater control circuit includes a connector P5 providing connections to temperature sensor 52. Comparator 90 and counter 91 condition opto-coupler 97 as previously described, and a transistor 98 provides open sensor protection. A transistor 99 provides power line clock pulses to counter 91.

To provide an indication to the user that water being drawn from faucet 20 is within a predetermined range of operating temperatures, thermistor 74 is also connected through a resistor 100 to the inverting input of a comparator 101. The non-inverting input of this comparator is connected to the arm of the range select potentiometer 83, which together with fixed resistors 102, 103, 104 and 105 forms part of a voltage divider between the −9 volt source of the module, the output of comparator 101 and ground. A reference voltage is established at the arm of potentiometer 83, and hence at the non-inverting input of comparator 101. Resistors 102 and 105 introduce positive feedback at the output of amplifier 101 which establishes a hysteresis of approximately 5 degrees Fahrenheit between temperatures at which the lamp is lighted and extinguished. Capacitor 106 introduces a desirable time constant The output of comparator 101 is applied to the inverting input of a second comparator 107, wherein it is inverted and amplified. The output of comparator 107 is applied through a transistor 108 to indicator lamp 21 to indicate to the user that the water temperature at faucet 20 is within the selected operating range To provide for control of solenoid valve 44, the water level sensing probe 57 is connected to one input terminal of a full-wave bridge rectifier network 110. The other input of this network is connected through a secondary winding 111 of a power transformer 112 to ground, causing an AC voltage to be impressed across the bridge rectifier network when water in reservoir 30 rises to a level sufficient to establish electrical conductivity between probe 57 and ground. This voltage is rectified and applied through a filter network comprising resistors 113 and 114 and capacitor 115 to the inverting input of a comparator 116. This comparator amplifies the rectified signal, and applies the amplified signal to the inverting input of an additional comparator 117, wherein it is inverted and further amplified. A feedback network comprising resistors 118, 119 and 120 provide positive feedback to establish a bi-stable switching condition at valve 44. A resistor 121 and diode 122 connected between the output of comparator 117 and the inverting input of comparator 116 are provided to further this purpose.

The output of comparator 117 is applied through a transistor 123 to a conventional optical isolator 124, which provides in the presence of an output signal from the comparator an appropriate signal to the gate electrode of a triac 125. This device connects one side $L_1$ of the AC line to solenoid valve 44 to actuate the valve and admit unheated water to reservoir 30. This continues until the water rises to the level of probe 57 at which time the alternating current applied to bridge rectifier network 110 causes amplifiers 116 and 117 to be driven into cut-off and the gate signal to be removed from triac 125.

The various negative polarity and positive polarity voltages required by the circuitry of control module 70 may be provided by a conventional power supply circuit 126. This circuit receives alternating current from a secondary winding 127 of power transformer 112. One terminal of winding 127 is connected to ground and the other terminal is connected to the temperature control circuit to supply clock pulses to counter 91. The primary winding 130 of transformer 112 is connected to the AC line ($L_1$ and $L_2$) utilized to power the hot water dispenser.

Thus, a compact unitary module 70 is utilized to provide all basic control functions of the hot water dispenser. The inputs and outputs of this module are connected directly to the associated sensing and actuator components of the dispenser. This provides an arrangement well suited for efficient and economical manufacture.

The level of faucet 20 is preferably several inches below the nominal water level in the reservoir. Since the reservoir is not pressurized the output flow rate from the reservoir is dependent on the water height above the faucet. When the water level falls below the sensing probe the refill circuit energizes solenoid valve 44, allowing water to enter the tank through flow regulator 45. The flow regulator is set such that hot water present above the faucet level tends to remain there because incoming cold water flows at a slower rate than the rate from the faucet. The flow regulator allows the faucet flow to outrun the incoming water so the hot water in the outlet zone at the top of the reservoir is utilized.

By reason of the heater control circuit being responsive to the sensing of steam in a venting conduit instead of a thermostat in the reservoir, and by reason of the control circuit applying multiple current levels to the heater in response to the repetition intervals of such steam sensing, unnecessary heating and boiling of the reservoir water is avoided and an energy efficient boiling water dispenser capable of dispensing large volumes of water heated to actual boiling temperature is achieved by the invention.

While a particular embodiment of the invention has been shown and described, changes and modifications may be made therein without departing from the invention in its broader aspects For example, other known sensors may be substituted for the thermistor as the sensor 52 to provide an indication of the presence or absence of steam. Such sensors might include an audio device responsive to a noise or whistling sound produced by steam or a moisture or humidity sensor responsive to the presence of steam or an optical sensor such as a photo-cell might be used. Therefore, the aim in the appended claims is to cover all such changes and modifications as fall within the true spirit and scope of the invention.

I claim:

1. A boiling water dispensing apparatus comprising:
a hot water reservoir;
means including a reservoir heating element within said reservoir operable from an applied electric current for heating water in said reservoir;
inlet means for admitting cold water into said reservoir;
outlet means for discharging heated water from said reservoir;
steam detection means responsive to the presence of boiling water in said reservoir for producing a control signal indicative thereof, said steam detection means being generally thermally isolated from said hot water reservoir for preventing the temperature of the reservoir from affecting the steam detection means; and
temperature regulating means responsive to said control signal for controlling the application of electrical current to said resistance means to maintain water in said reservoir substantially at actual boiling temperature.

2. A boiling water dispenser apparatus as defined in claim 1 wherein said reservoir includes a venting port, and said steam detection means detect steam exiting said reservoir through said port.

3. A boiling water dispenser apparatus as defined in claim 2 including a conduit defining a flow path for steam exiting said reservoir and wherein said steam detection means detect steam in said flow path.

4. A boiling water dispenser apparatus as defined in claim 3 wherein said steam detection means comprises a temperature sensing element disposed in said flow path in thermal communication with steam flowing therein, and in relative thermal isolation to the water in said reservoir.

5. A boiling water dispenser apparatus as defined in claim 4 wherein said steam detection means comprise a mounting block formed of a relatively thermally nonconductive material for positioning said sensing element in said flow path.

6. A boiling water dispenser apparatus as defined in claim 4 wherein said temperature sensing means comprises a thermistor.

7. A boiling water dispenser apparatus as defined in claim 1 wherein temperature regulating means apply electrical current continuously in the event said steam detection means fail to detect steam for a predetermined period of time, and upon steam being detected, apply current periodically to said heating element.

8. A boiling water dispensing apparatus comprising:
a hot water reservoir;
means including a resistance heating element within said reservoir operable from an applied electric current for heating water in said reservoir;
inlet means for admitting cold water into said reservoir;
outlet means for discharging heated water from said reservoir;
venting means defining a flow path for transporting steam formed within said reservoir away from said reservoir, said venting means discharging steam to the ambient atmosphere; and
temperature regulating means including a temperature sensing element responsive to the occurrence of steam associated with said venting means for controlling the application of electric current to said resistance heating element to maintain the water in said reservoir at actual boiling temperature, said temperature sensing element being located outside of said vent means generally surrounded by the ambient atmosphere and being thermally isolated from said hot water reservoir for preventing the temperature of the reservoir from affecting the temperature sensing element.

9. A boiling water dispensing apparatus as defined in claim 8 wherein said temperature sensing means comprise a thermistor.

10. A boiling water dispensing apparatus as defined in claim 8 wherein said temperature regulating means apply full excitation to said heating element following a predetermined period of time having elapsed in which steam has not occurred in said venting means, and reduced excitation to said heating element prior to said predetermined period of time having elapsed.

11. A boiling water dispensing apparatus as defined in claim 10 wherein said temperature regulating means apply said reduced excitation to said heating element intermittently prior to said predetermined period of time having elapsed.

12. A dispenser for heated water substantially at a boiling temperature comprising a water reservoir, a heater associated with said reservoir for heating water in the reservoir, means for isolating steam generated when said water is at a boiling temperature and discharging the steam to the ambient atmosphere, and control means including a sensor responsive to the presence or absence of steam at a discharge point of said isolating means for operating said heater means for maintaining the water in said reservoir substantially at said boiling temperature, said sensor being thermally isolated by said isolating means from said reservoir for preventing the temperature of the reservoir from affecting the sensor.

13. A dispenser for providing water at substantially a boiling temperature comprising a water reservoir, electrical heater means associated with said reservoir for heating water in said reservoir, control means for applying electrical current to said heater means at a predetermined high duty cycle when the water is substantially below said boiling temperature and for applying electrical current to said heater means intermittently at a relatively low duty cycle sufficient to maintain the water substantially at said boiling temperature when the water is substantially at said boiling temperature, fluid passageway means for permitting flow of heated fluid from said reservoir to the ambient atmosphere when said water in the reservoir is at least at a boiling temperature, and wherein said control means comprises a sensor positioned outside of said fluid passageway for sensing said fluid flowing through said passageway means to the ambient atmosphere, said sensor being thermally isolated from said reservoir and said fluid passageway means for preventing the temperature of said reservoir or fluid passageway means from affecting the sensor.

14. A dispenser for boiling water comprising a water reservoir, heater means associated with said reservoir for heating water in the reservoir to a boiling temperature, vent means connected with said reservoir and having a discharge opening for venting steam generated by boiling water from the reservoir to the ambient atmosphere, a receptacle disposed in alignment with said discharge opening for accumulating condensate from steam from said discharge opening, said receptacle permitting subsequent evaporation of the condensate into the surrounding atmosphere, said receptacle being thermally connected with said reservoir and heated thereby for promoting evaporation of the condensate, control means comprising a sensor element disposed between said discharge opening and said receptacle in said ambient atmosphere being responsive to the presence and absence of steam flowing from said discharge opening for energizing said heater means intermittently and sufficiently to maintain the water in the reservoir substantially at boiling temperature, said sensor element being thermally isolated from said reservoir, vent means and said receptacle for preventing the temperature of said reservoir, vent means and said receptacle from affecting the sensor element.

* * * * *

UNITED STATES PATENT AND TRADEMARK OFFICE
CERTIFICATE OF CORRECTION

PATENT NO. : 5,019,690

DATED : May 28, 1991

INVENTOR(S) : John T. Knepler

It is certified that error appears in the above-identified patent and that said Letters Patent is hereby corrected as shown below:

Column 9, Line 4  " means including a reservoir heating "

it should be:  -- means including a resistance heating --

Signed and Sealed this

Twenty-second Day of December, 1992

Attest:

DOUGLAS B. COMER

Attesting Officer

Acting Commissioner of Patents and Trademarks